United States Patent  [15] 3,656,798
Dodgen et al. [45] Apr. 18, 1972

[54] CAMPING TRAILER SAFETY AND INSULATING WINDOW

[72] Inventors: John N. Dodgen, Humboldt; Harry L. Taylor, Dakota City, both of Iowa

[73] Assignee: Dodgen Industries, Inc., Humboldt, Iowa

[22] Filed: May 4, 1970

[21] Appl. No.: 34,492

[52] U.S. Cl. ............................................ 296/23 MC, 296/84
[51] Int. Cl. ................................................................ B60p 3/32
[58] Field of Search ................................ 296/23, 23 MC, 84

[56] References Cited

UNITED STATES PATENTS 3,288,518  11/1966  Oliver .............................. 296/23 MC
3,443,824  5/1969  Dietrich .................................. 296/84
3,146,019  8/1964  Peyches .................................. 296/84

Primary Examiner—Philip Goodman
Attorney—Zarley, McKee & Thomte

[57] ABSTRACT

A pickup-type camper having a forward window in a sleeping compartment over the cab of the truck wherein the window includes a first window in the plane of the front compartment wall and a second window spaced forwardly therefrom and having a convex forwardly configuration. Molding fasteners secure the two windows together and to the front compartment wall.

7 Claims, 3 Drawing Figures

PATENTED APR 18 1972

3,656,798

INVENTORS
JOHN N. DODGEN
HARRY L. TAYLOR
BY
Zarley, McKee & Thomte
ATTORNEYS

CAMPING TRAILER SAFETY AND INSULATING WINDOW

A camper unit on a pickup truck having a window in a sleeping compartment over the pickup truck cab will subject the users of the compartment to adversity from the weather and impact in the case of an accident. A person sleeping in this compartment will be in close proximity to the cold out-of-doors when a camper is being used in the wintertime. In the case of accidents, the person may be ejected from this compartment right through a conventional window especially if the accident involves the camper stopping abruptly thus causing the occupant of the compartment to continue to move forwardly and out through the window.

The safety and insulating window of this invention for a camper vehicle both insulates the occupants of the compartment over the passenger cab from adverse outside weather but also insures the safety of the occupant since the two window construction in spaced apart relationship more than doubles the strength of the compartment front wall. While the first inner window may be broken upon impact the second outer convex window should hold the occupants within the compartment and prevent otherwise certain injury to them that would occur upon being ejected from the camper as in the case of a rear end collision.

It is also seen that the forward end of the camper is enhanced in appearance by the streamline window unit extending the substantial width of the camper and being convex forwardly from the top to the bottom along the substantial width of the window.

This invention consists in the construction, arrangements and combination of the various parts of the device, whereby the objects contemplated are attained as hereinafter more fully set forth, specifically pointed out in the claims, and illustrated in the accompanying drawings in which:

Figure 1:
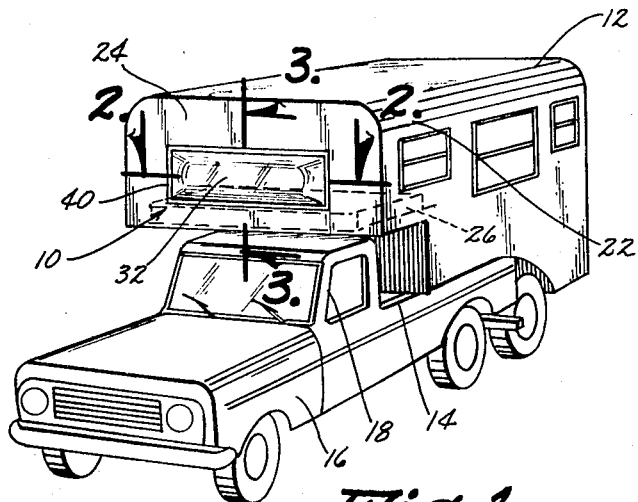
FIG. 1 is a perspective view of a pickup truck having a camper unit mounted thereon employing the safety and insulating window of this invention.
Figure 3:
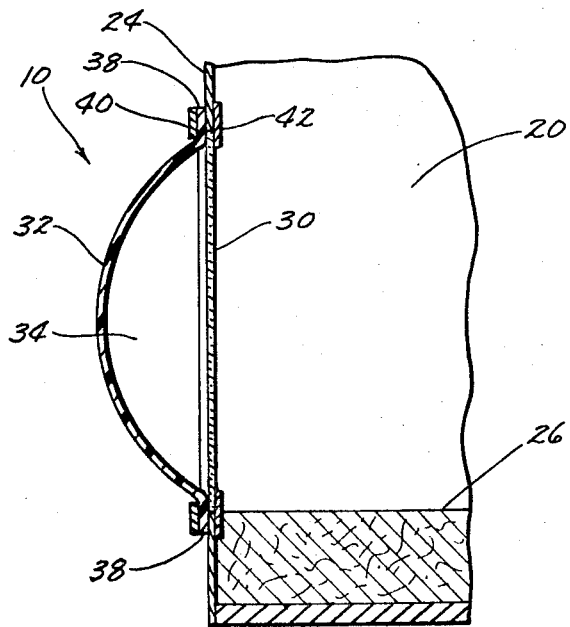
FIG. 3 is a cross-sectional view taken along line 3 — 3 in FIG. 1.

The safety and insulating window of this invention is referred to generally by the reference numeral 10 in FIG. 1 and is shown on a camper unit 12 mounted on the bed 14 of a pickup truck 16 having a passenger compartment cab 18. A sleeping compartment 20 as seen in FIG. 3 is provided in the forward section 22 of the camper 12 which extends over the cab 18. The safety and insulating window 10 is mounted in an opening formed in the forward wall 24 and extends transversely of the camper 12 forwardly of a mattress 26 inside the compartment 20. The mattress has a top plane at approximately the same level as the bottom edge of the window 10 as seen in FIG. 3 and persons sleeping on the mattress sleep parallel to the window 10.

Figure 2:
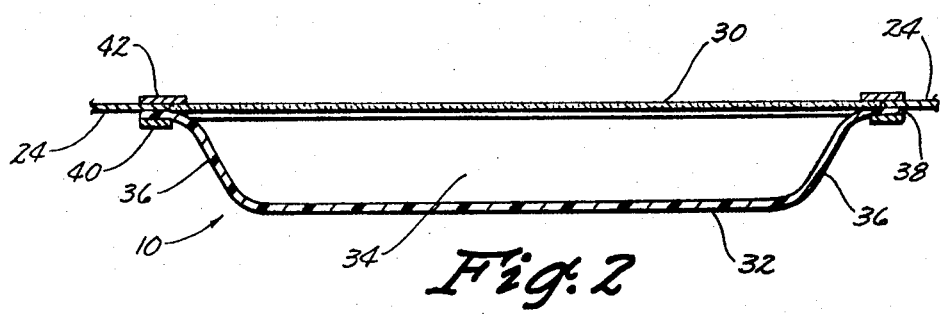
FIG. 2 is a cross-sectional view taken along line 2 — 2 in FIG. 1.

The safety and insulating window 10 includes an inner first safety glass window pane 30 in the plane of the front wall 24 and a forwardly spaced second window pane 32 of safety type glass such as Plexiglass. It is noted that the inner window 30 is of clear glass while the outer window 32 is tinted. The two glass panes 30 and 32 form a insulating chamber 34 therebetween. The forward window 32 has a convex outer or forward surface along its longitudinal length. As seen in FIG. 2, the opposite longitudinal ends 36 taper outwardly and terminate in a peripheral flange 38 extending parallel to the inner window 30 and in engagement therewith. A molding member 40 extends around the periphery of the window 10 and engages the outer peripheral flange 38 of the window 32 and cooperates with an inner molding 42 to hold the two windows 30 and 32 together and to the front compartment wall 24.

Thus it is seen in operation that the comfort and safety of persons using the compartment 22 of the camper 12 is substantially enhanced by the use of the insulating and safety window 10. The chamber 34 between the two windows 30 and 32 insulates the sleeping compartment 20 from the outside and cold climates. The persons in the compartment 20 will be sleeping closely adjacent the window 10 and thus will be directly affected by the heat transfer through the window 10. The window construction of this invention substantially eliminates the adverse affects of colder outside temperatures thus making the camper of this invention satisfactorily usable in winter climates in all parts of the United States. In an accident situation a person in the compartment 20 may cause the glass window 30 to be broken, however, the stronger forward window 32 convex forwardly in shape will insure that persons will not be ejected from the camper. It is appreciated that the convex configuration provides a stronger window than a flat type window. Additionally the tint in the outer window 32 will minimize the adverse affects of sun rays shining in the compartment 20.

We claim:

1. In a camping vehicle carried on a powered vehicle and having a compartment extending over the passenger compartment of the powered vehicle, the improvement comprising, an elongated opening in the front wall of said compartment extending transversely of said vehicle, a first transparent window extending over said opening in substantially the plane of said front wall, and a second transparent window secured to said front wall and spaced forwardly therefrom from said first window thereby providing a chamber therebetween, said second window being convex outwardly along its width throughout its substantial length, said second window flaring outwardly at its opposite ends for engagement with said front wall, said first and second windows being formed from a safety glass material, said chamber between said first and second windows providing a heat insulation chamber for said compartment, said first and second windows having peripherally extending flanges in superimposed relationship parallel to and in operative engagement with said front wall, and fastening means extending around the periphery of said first and second windows in engagement with said flange of said second window and securing said first and second windows to said front wall.

2. The structure of claim 1 wherein said compartment includes a sleeping bed structure arranged longitudinally of said opening and having a top surface in a horizontal plane extending substantially at the same level as the lower longitudinal edge of said opening.

3. The structure of claim 2 wherein the second window includes a tinted coloration.

4. In a camping vehicle carried on a powered vehicle and having a compartment extending over the passenger compartment of the powered vehicle, the improvement comprising, an elongated opening in the front wall of said compartment extending transversely of said vehicle, a first transparent window extending over said opening in substantially the plane of said front wall, a second transparent window secured to said front wall and spaced forwardly therefrom, and means securing said first and second windows together adjacent their peripheries to form a closed heat insulation chamber between said first and second windows.

5. The structure of claim 4 wherein said second window is convex outwardly along its width throughout its substantial length.

6. The structure of claim 5, wherein said first and second windows are formed from a safety glass material.

7. The structure of claim 4 wherein said second window flares outwardly at its opposite ends for engagement with said front wall.

* * * * *